United States Patent
Casagrande et al.

(10) Patent No.: US 9,419,660 B2
(45) Date of Patent: Aug. 16, 2016

(54) SIGNAL RECEIVER WITH A DUTY-CYCLE CONTROLLER

(71) Applicant: The Swatch Group Research and Development Ltd., Marin (CH)

(72) Inventors: Arnaud Casagrande, Bole (CH); Carlos Velasquez, Neuchatel (CH); Emil Zellweger, Lommiswil (CH)

(73) Assignee: The Swatch Research and Development Ltd., Marin (CH)

( * ) Notice: Subject to any disclaimer, the term of this patent is extended or adjusted under 35 U.S.C. 154(b) by 0 days.

(21) Appl. No.: 14/530,296

(22) Filed: Oct. 31, 2014

(65) Prior Publication Data
US 2015/0126145 A1    May 7, 2015

(30) Foreign Application Priority Data

Nov. 1, 2013    (EP) .................................... 13191280

(51) Int. Cl.
| | | |
|---|---|---|
| H04B 17/00 | (2015.01) | |
| H04B 1/10 | (2006.01) | |
| H04B 15/06 | (2006.01) | |

(52) U.S. Cl.
CPC .............. *H04B 1/1027* (2013.01); *H04B 15/06* (2013.01); *H04B 17/0062* (2013.01); *H04B 2001/1054* (2013.01)

(58) Field of Classification Search
CPC ............. H04B 17/004; H04B 17/0057; H04B 17/0062; H04B 1/1027; H04B 1/26; H04B 1/40; H04B 15/00; H04B 1/405; H04B 1/3822; H04B 1/406; H04B 1/44; H04B 1/54; H04B 1/48; H04B 1/525; H04B 1/18; H04W 16/14; H04W 28/04

USPC .......... 455/63.1, 67.11, 67.13, 77, 550.1, 78, 455/114.1–114.3, 115.1, 255–260, 296, 455/313, 333, 334, 226.1, 227, 234.1, 234.2
See application file for complete search history.

(56) References Cited

U.S. PATENT DOCUMENTS

| | | |
|---|---|---|
| 2003/0080792 A1 | 5/2003 | Azmoodeh |
| 2011/0157067 A1 | 6/2011 | Wagner et al. |
| 2012/0046005 A1 | 2/2012 | Simmons et al. |
| 2012/0154010 A1 | 6/2012 | Singhal et al. |
| 2012/0164966 A1 | 6/2012 | Casagrande et al. |
| 2014/0194076 A1* | 7/2014 | Hwang .................. H04B 15/00 455/77 |

OTHER PUBLICATIONS

European Search Report issued in corresponding application EP 13 19 1280, completed Mar. 6, 2014.

* cited by examiner

*Primary Examiner* — Nhan Le
(74) *Attorney, Agent, or Firm* — Oblon, McClelland, Maier & Neustadt, L.L.P.

(57) ABSTRACT

The signal receiver has means to suppress at least one higher harmonic component from a MEMS or crystal oscillator having a reference resonator in filtered intermediate signals of a signal receiver. The signal receiver comprises an antenna for receiving electromagnetic signals, a low noise amplifier for amplifying signals received by the antenna, one MEMS or crystal oscillator comprising a reference resonator to generate an oscillating signal with a predefined duty-cycle, a mixer for mixing the amplified and received signals with the oscillating signal to generate intermediate signals, a band-pass filter to filter the intermediate signals, and a duty-cycle controller coupled to the MEMS or crystal oscillator and coupled to the output of the band-pass filter to analyze the spectrum of the filtered intermediate signals and to modify the duty-cycle of the oscillating signal in response to the spectrum analysis of the filtered intermediate signals.

8 Claims, 2 Drawing Sheets

US 9,419,660 B2

SIGNAL RECEIVER WITH A DUTY-CYCLE CONTROLLER

The application claims priority from European Patent Application No. 13191280.0 filed Nov. 1, 2013, the entire disclosure of which is hereby incorporated herein by reference.

FIELD OF THE INVENTION

The present invention relates to the field of signal receivers, in particular to receivers for radio-frequency signals. The invention also relates to a respective method of suppressing of at least one higher harmonic component from an oscillator having a reference resonator in intermediate signals of a signal receiver.

BACKGROUND AND PRIOR ART

For transmission of electromagnetic signals, in particular of radio-frequency signals suitable receivers are required.

A conventional receiver design is for instance illustrated in FIG. 1. The signal receiver 1 comprises an antenna 12 for receiving electromagnetic signals. The antenna 12 is connected with a low noise amplifier (LNA) 14 that is adapted to amplify the signals received by the antenna 12. The LNA is further connected with a mixer 16 for mixing the amplified and received signals with an oscillating signal 50 provided by a local oscillator or by a crystal oscillator 20. The output of the mixer 16 is connected to a band-pass filter 18 to filter the intermediate and down-converted signals 40 of the mixer 16. In FIG. 1, the spectrum of the intermediate signals 40 is shown as amplitude or power (p) over frequency (f).

Typically, the local oscillator or crystal oscillator 20 makes use of a signal generator 24 with a reference resonator 22 such like a quartz resonator, providing a well-defined and rather stable reference frequency signal. For instance with typical quartz resonator applications, the signal generator 24 with the reference resonator 22 operates at a reference frequency of 26 MHz. Generally the local oscillator 20 further includes a PLL unit not shown in FIG. 1, which is connected between the signal generator 24 and the mixer 16, in order to supply a high frequency oscillating signal. In case of radio-frequency transmission the signal receiver 1 may for instance operate in a Bluetooth range, hence in the 2.4 GHz band by making use of a signal generator 24 with a quartz-based reference resonator 22 operating at 26 MHz. The 93rd, 94th and 95th higher harmonics of the frequency of the oscillator 20 based on the reference resonator 22 may then coincide with the band 41 of the band-pass filter 18.

Even though these higher harmonic components 42 of the oscillator based on the reference resonator could be damped and attenuated the electromagnetic signals received by the antenna, in particular the intermediate signals 40 received after the down-conversion by the mixer 16 may still be severely perturbed. This problem becomes even more dominant when the signal receiver is implemented in a single integrated circuit.

Another conventional receiver for FSK radio-frequency signals with a high sensitivity demodulator is for instance described in US Patent Application No. 2012/0164966 A1.

US Patent Application No. 2012/0046005 A1 describes a wireless communication device with a duty cycle control of an oscillator. This device needs operating simultaneously a tune transmit path and a receive path for regulating the duty cycle, which is a drawback.

SUMMARY OF THE INVENTION

It is therefore an object of the present invention to provide an improved signal receiver, in particular for receiving radio-frequency signals, wherein the effect of higher harmonics from an oscillator having a reference resonator can be effectively attenuated or even completely compensated. The solution should be rather space and cost efficient. Furthermore, the solution should not affect the general operation and function of the signal receiver and of its various components.

In a first aspect the invention relates to a signal receiver, in particular to a radio-frequency signal receiver. The signal receiver comprises an antenna for receiving electromagnetic signals. Furthermore, the signal receiver comprises at least one low noise amplifier (LNA) for amplifying signals received by the antenna. Hence, the antenna may be directly interconnected with the low noise amplifier. Additionally the signal receiver comprises at least one crystal or MEMS oscillator comprising a signal generator with a reference resonator to generate an oscillating signal with a predefined duty-cycle.

Typically, the MEMS or crystal oscillator is an electronic oscillator circuit that uses the mechanical resonance of a vibrating MEMS or a vibrating crystal of piezoelectric material to create an electrical signal with a rather precise frequency. The reference resonator may be a MEMS resonator or comprise a quartz crystal as it is commonly used in electronic applications. The MEMS or crystal oscillator, hence the electronic oscillator circuit is adapted to generate an oscillating signal with a predefined duty-cycle. The duty-cycle defines the ratio of ON times and OFF times of the oscillating signal. Typically, the oscillating signal features a sequence of square-shaped pulses but may feature any other suitable waveform that can be processed by a mixer.

Additionally, the signal receiver also comprises a mixer for mixing the amplified and received signals obtained from the LNA with the oscillating signal obtained from the MEMS or crystal oscillator in order to generate intermediate, hence down-converted signals. Furthermore, the crystal or MEMS oscillator can include a PLL unit at the output to supply the oscillating signal for the mixer. Also the mixer may be implemented in various different ways. For instance, the mixer may comprise or may be implemented as a sub-sampling mixer, a Gilbert cell or as a passive mixer only to mention a few. The mixer receives the oscillating signal from the local oscillator or from the MEMS or crystal oscillator as well as the amplified signals from the LNA as input signals. The mixer then provides and generates intermediate signals at an output that are further processed by a band-pass filter which is adapted to filter the intermediate signals provided by the mixer.

The signal receiver further comprises a duty-cycle controller that is coupled to the MEMS or crystal oscillator and which is further coupled to the output of the band-pass filter. By connecting the duty-cycle controller to the output of the band-pass filter, the spectrum of the filtered intermediate signals obtained at the output of the band-pass filter can be analyzed by the duty-cycle controller. In response to this spectrum analysis the duty-cycle controller is operable to modify the duty-cycle of the oscillating signal. This modification can be conducted by the coupling of the duty-cycle controller to the MEMS or crystal oscillator.

Through a modification of the duty-cycle of the oscillating signal, the higher harmonics of the frequency from the oscillator having the signal generator with the reference resonator in the filtered intermediate signals can be attenuated or modified. Hence, by selectively modifying the waveform of the oscillating signals its Fourier spectrum and the output of the mixer can be modified. In this way, a particular higher harmonic coinciding with the band of interest of the band-pass filter can be attenuated in the filtered intermediate signals without modifying the frequency of the oscillating signal. Hence, the modification of the duty-cycle of the oscillating signal has basically neither an influence to the signal mixing nor to the general behavior and operating of the signal receiver at all. The modification of the duty-cycle of the oscillating signal mainly reflects in the varying Fourier spectrum of the oscillating signal and results in a varying distribution of the magnitudes of the higher harmonics of the frequency from the oscillator having the reference resonator in the intermediate signals.

According to another embodiment, the duty-cycle controller is adapted to minimize the amplitude of at least one higher harmonic component of the oscillator having the reference resonator in the filtered intermediate signals. If for instance the band of interest of the signal receiver is the 2.4 GHz band, the duty-cycle controller is operable to adapt or to modify the duty-cycle of the MEMS or crystal oscillator's oscillating signal in such a way, that the higher harmonics of e.g. a 26 MHz reference frequency from the MEMS or crystal oscillator are at least attenuated or suppressed in the filtered intermediate signals. For instance, the $93^{rd}$, $94^{th}$ and $95^{th}$ higher harmonics of a 26 MHz reference frequency, which equal to 2.418 GHz, 2.444 GHz and 2.470 GHz may be effectively attenuated or damped in the filtered intermediate signals. In this way, the effect of higher harmonics from the oscillator having the reference resonator downstream of a mixer can be compensated or even completely suppressed.

According to another embodiment, the duty-cycle controller comprises a measurement unit to measure the magnitude of a selected harmonic component of the filtered intermediate signals. The measurement unit is typically connected and coupled with the output of the band-pass filter. Since the regulation loop provided by the duty-cycle controller, the MEMS or crystal oscillator and the mixer and/or the band-pass filter is operable to suppress selected harmonics of the reference frequency from the oscillator having the reference resonator, the measurement unit may be particularly adapted to measure the magnitude, hence the amplitude of predefined harmonic components of the filtered intermediate signals that coincide with higher harmonics from the oscillator having the reference resonator.

For instance, the measurement unit may be adapted to exclusively detect and sense the magnitude or amplitude of the $93^{rd}$, $94^{th}$ or $95^{th}$ higher harmonics of the reference frequency. Other frequency components of the filtered intermediate signals are of no further interest for the duty-cycle controller. The frequencies and the particular higher harmonics as mentioned above are only exemplary and are by no way to be interpreted to limit the scope of the present application towards a particular radio-frequency band. Generally, the signal receiver with its duty-cycle controller is operable with a large variety of different higher harmonics and reference frequencies of a MEMS or crystal oscillator.

According to another embodiment, the duty-cycle controller comprises a control unit coupled to the measurement unit and being operable to generate a duty-cycle modification signal in response to the measured magnitude of the selected harmonic component. Typically, the control unit is either operable to compare an actually measured magnitude or amplitude of a selected harmonic component with a predefined value or with variable values that may be dynamically determined during operating of the signal receiver. The duty-cycle modification signal which is generated by the control unit either serves to increase or to decrease the duty-cycle, hence the relation between ON times and OFF times of the MEMS or crystal oscillator's oscillating signal.

Additionally or alternatively it is also conceivable, that the control unit is operable to modify not only the duty-cycle but also to modify the waveform of the oscillating signal in combination with a modification of the duty-cycle thereof. In this way, the composition of higher harmonics in the filtered intermediate signals can be modified in a variety of different ways.

In still another embodiment the signal receiver also comprises a duty-cycle modifier which is coupled to the duty-cycle controller or which is even integrated into the duty-cycle controller. The duty-cycle modifier is particularly operable to increase or to decrease the duty-cycle of the oscillating signal in response to the duty-cycle modification signal obtained from the control unit. In other words, the duty-cycle modifier is operable to process the duty-cycle modification signal generated by the control unit of the duty-cycle controller. If the duty-cycle modification signal is indicative to increase the duty-cycle, the duty-cycle modifier is operable to increase the duty-cycle, e.g. by a predefined discrete step.

If the duty-cycle modification signal indicates to decrease the duty-cycle, the duty-cycle modifier will decrease the duty-cycle of the oscillating signal accordingly. The duty-cycle modifier may also be implemented into the MEMS or crystal oscillator or it may belong to the same. The duty-cycle modifier may therefore be an integral or a separate component of the electronic oscillator circuit of the MEMS or crystal oscillator that is operable to generate the oscillating signal on the basis of the reference frequency from the oscillator having the reference resonator thereof.

In still another embodiment the duty-cycle controller also comprises a memory or some storage space to at least temporarily store a measured magnitude of a selected harmonic component of the filtered intermediate signals. By means of the memory, previously measured magnitudes of the selected harmonic component of the output of the band-pass filter can be stored in order to provide a comparison with actually measured magnitudes of the same harmonic component. In this way, the effect of a modified duty-cycle can be directly monitored and evaluated. It is even conceivable, that the memory comprises various memory cells allowing storing a temporal sequence of successively measured magnitudes of the harmonic component. It is even conceivable, that a whole series of multiple harmonic components is stored in the memory.

Additionally or alternatively, the memory may also serve to store a kind of a look-up table, in which various magnitudes of selected harmonic components are directly assigned to predefined duty-cycles. In this way, the control unit may be adapted to select a predefined duty-cycle in response to the measurement of a particular magnitude of a selected harmonic component.

In a further embodiment the control unit is operable to compare the magnitude of an actually measured harmonic component with the magnitude of a previously stored harmonic component of the filtered intermediate signals in order to generate the duty-cycle modification signal. Here it is conceivable, that the control unit permanently conducts a comparison of an actually measured harmonic component with a single or with a series of previously stored harmonic components.

The control unit may execute this comparison continuously. The control unit may be operable to modify the duty-cycle in small but discrete steps and to monitor the consequences of this modification. If an initial modification leads to a desired suppression of the harmonic component in the filtered intermediate signals, in a subsequent step, the duty-cycle will be repeatedly modified in the same way. This regulation loop may continue until the control unit detects that the harmonic component of the filtered intermediate signals increases in amplitude. Then the duty-cycle controller will return to the previously selected duty-cycle. It is conceivable, that the control unit is permanently operating in such a signal-comparing control loop.

According to another embodiment the duty-cycle controller may be at least temporarily deactivatable, especially when the antenna receives electromagnetic signals to be further processed by the signal receiver. With this implementation the modification of the duty-cycle of the oscillating signal only takes place in such instances where the signal receiver is idle or when the signal receiver does actually not receive any electromagnetic signals. By selectively deactivating or activating the duty-cycle controller the energy consumption of the signal receiver can be reduced. Moreover, the performance of the signal receiver for processing of received electromagnetic signals will not be influenced or perturbed by the duty-cycle regulation loop, which is typically implemented by the duty-cycle controller, the MEMS or crystal oscillator, the mixer and the band-pass filter.

In another aspect the invention also relates to a method of suppressing at least one higher harmonic component from an oscillator having a reference resonator in filtered intermediate signals of a signal receiver as described above. The method comprises the steps of:

receiving electromagnetic signals by means of an antenna,
amplifying the received signals by means of at least one low noise amplifier,
generating an oscillating signal by means of at least one MEMS or crystal oscillator comprising a reference resonator,
mixing the amplified and received signals with the oscillating signal to generate intermediate signals,
filtering the intermediate signals,
analyzing the spectrum of the filtered intermediate signals, and
modifying the duty-cycle of the oscillating signal in response to the spectrum analysis of the filtered intermediate signals by means of a duty-cycle controller that is coupled to the MEMS or crystal oscillator and which is also coupled to the output of the band-pass filter, said duty-cycle being defined by the ratio of ON times and OFF times of the oscillating signal, in order to minimize the amplitude of at least one higher harmonic component from the MEMS or crystal oscillator having the reference resonator in the filtered intermediate signals.

By the modification of the duty-cycle of the oscillating signal generated by the MEMS or crystal oscillator the distribution of higher harmonic components in the intermediate signals can be modified away to effectively suppress the contribution of a selected higher harmonic component in the band of interest of the band-pass filter.

In general, the method of suppressing at least one higher harmonic component is executed by the signal receiver as described above. In this regard, any features and benefits as described above in connection with the signal receiver equally apply to the method of suppressing the at least one higher harmonic component of the MEMS or crystal oscillator having the reference resonator and vice versa.

According to a further embodiment the duty-cycle of the oscillating signal is modified by the duty-cycle controller to minimize the amplitude of at least one higher harmonic component of the MEMS or crystal oscillator having the reference resonator in the filtered intermediate signals. Here, the duty-cycle controller is typically part of a control loop which is operable to find and to identify the optimal duty-cycle in order to minimize the selected higher harmonic component of or in the filtered intermediate signals. The duty-cycle controller may be implemented and may be operable in many different ways.

In a further embodiment the duty-cycle of the oscillating signal is decreased or increased in predefined discrete steps until the amplitude of a selected higher harmonic component of the MEMS or crystal oscillator having the reference resonator reaches a minimum in the filtered intermediate signals. The higher harmonic component of interest is either predetermined or can be selected by various settings of the signal receiver. The selection of the higher harmonic component to be suppressed may be based on the selected band and bandwidth of the band-pass filter.

Typically, not only a single but all higher harmonic components of the MEMS or crystal oscillator having the reference resonator falling into the band of the band-pass filter are to be suppressed by the above mentioned method. In order to find a minimum amplitude of at least one selected higher harmonic component or of several selected higher harmonic components, the duty-cycle controller may per default modify a given duty-cycle at least in a small but discrete step. Thereafter, the effect of this initial duty-cycle modification is monitored in the filtered intermediate signals. If the amplitude of the selected higher harmonic component increases, the duty-cycle modification will be reversed in a proceeding step.

For instance, the duty-cycle may be lowered or increased until the amplitude of the selected higher harmonic component of the MEMS or crystal oscillator having the reference resonator reaches a minimum. An optimal duty-cycle can be obtained by implementing a regulation loop making use of standardized digital signal processing units.

According to a further embodiment the amplitude of the higher harmonic component in the filtered intermediate signals is measured and at least temporarily stored in a memory. The memory is typically located in the duty-cycle controller. Since the duty-cycle controller is clocked, the memory may comprise a shift register adapted to store at least one or a few consecutively measured amplitudes that are obtained at subsequent clock times. By making use of a memory an actually measured amplitude of a selected higher harmonic component may be compared with a previously stored amplitude.

This comparison is then indicative whether the duty-cycle has been previously modified in a way to reduce the amplitude of the selected higher harmonic component or not. If the comparison reveals that the amplitude of the higher harmonic component decreases, the duty-cycle will be modified in the same direction until a minimum is reached. In case that the comparison reveals that the amplitude of the higher harmonic component increases, the direction of the duty-cycle modification will be changed or reversed.

In this way and according to a further embodiment the duty-cycle of the oscillating signal is decreased or increased depending on a comparison between an actually measured amplitude and a previously stored amplitude of the higher harmonic component in the filtered intermediate signals.

According to another embodiment the duty-cycle of the oscillating signal is kept constant at times where the antenna actually receives electromagnetic signals to be further processed by the signal receiver. In this way, the duty-cycle controller may be at least temporarily deactivated in order to save energy and to avoid any perturbation of the signal receiver's signal processing that may be due to duty-cycle modification of the oscillating signal.

BRIEF DESCRIPTION OF THE DRAWINGS

In the following, various embodiments of the invention will be described by making reference to the drawings, in which.

DETAILED DESCRIPTION

Figure 1:
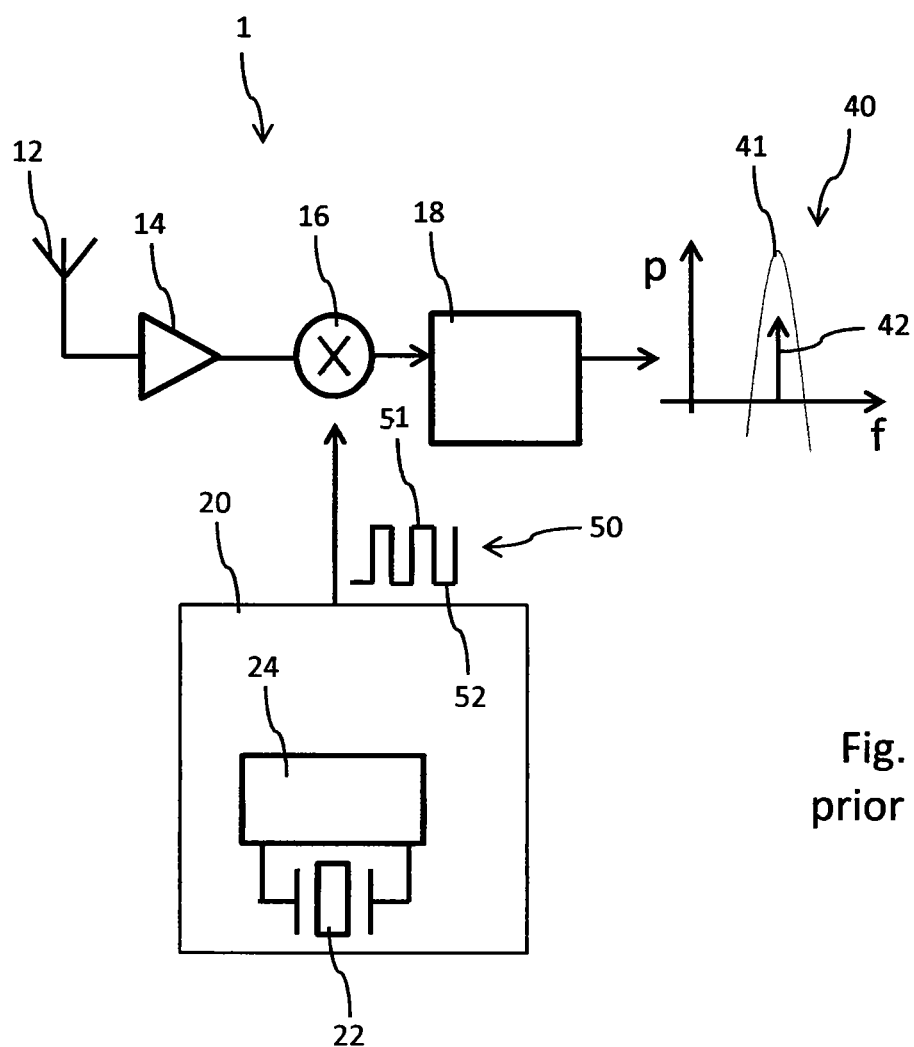
FIG. 1 shows a conventional signal receiver as known in the prior art.
Figure 2:
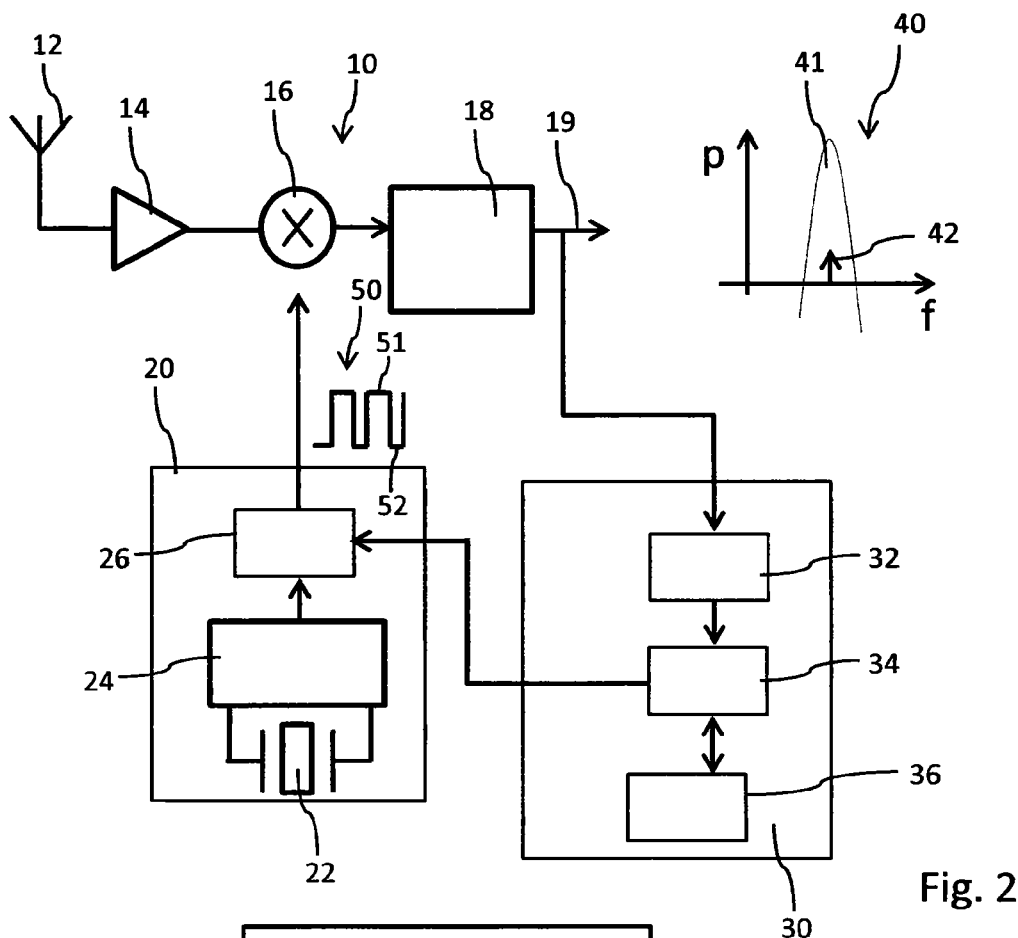
FIG. 2 shows a schematic block diagram of a signal receiver according to the present invention.

FIG. 2 shows a schematic block diagram of a signal receiver 10 according to the present invention. The signal receiver 10, typically implemented to receive radio-frequency signals comprises an antenna 12 that may operate at a carrier frequency which may be for example around 2.4 GHz. The signals received by the antenna 12 are amplified in a low noise amplifier (LNA) 14. The amplified signals are frequency converted, in particular down-converted in a mixer 16 via an oscillating signal 50 that is provided by a MEMS or crystal oscillator 20. The output of the mixer 16 is coupled with the input of a band-pass filter 18 by way of which a band 41 of interest of the intermediate signals 40 can be selected for further processing in the signal receiver 10.

The MEMS or crystal oscillator 20 comprises a signal generator 24 which is locked to a reference resonator 22. The reference resonator 22 may be a MEMS resonator or implemented by a quartz crystal or the like resonators for providing by the signal generator 24 a constant and rather stable reference frequency, typically in the range of several MHz, e.g. 26 MHz. The signal generator 24 is operable to generate a signal having generally a sinusoidal waveform. Said signal generator 24 is further connected to a duty-cycle modifier 26 as explained hereafter, which generates on the basis of the signal from the signal generator 24, an oscillating signal 50 having for instance a rectangular waveform featuring an alternating sequence of ON times 51 and OFF times 52. The relation of the length of the ON times 51 and OFF times 52 determines the duty-cycle of the oscillating signal 50. Furthermore, the crystal or MEMS oscillator 20 can include a PLL unit not shown in FIG. 2 between the duty-cycle multiplier 26 and the mixer 16, to supply the oscillating signal with a higher frequency for the mixer.

Typically, higher harmonics of the frequency of the oscillating signal 50 strongly depend on the duty-cycle and the waveform of the oscillating signal 50. Hence, if the selected band 41 of the filtered intermediate signals 40 coincides with at least one higher harmonic component of the frequency from the MEMS or crystal oscillator 20 having the reference resonator 22, a respective component 42 will show up as a perturbation in the band of interest 41 of the filtered intermediate signals 40.

In order to suppress the contribution and distribution of selected higher harmonic components of the frequency from the MEMS or crystal oscillator having the reference resonator in the filtered intermediate signals 40, the receiver 10 further comprises a duty-cycle controller 30 which is coupled with the output 19 of the band-pass filter 18. The duty-cycle controller 30 is operable to measure and to analyze the spectrum of the filtered intermediate signals 40. The duty-cycle controller 30 is particularly adapted to determine and to measure the amplitude or magnitude of selected higher harmonic components 42 of the frequency from the MEMS or crystal oscillator 20 having the reference resonator 22.

For this the duty-cycle controller 30 comprises a measurement unit 32 in order to determine and to measure the magnitude or amplitude of selected higher harmonic components 42 of the filtered intermediate signals 40. Depending on this measurement the control unit 34 of the duty-cycle controller 30 is operable to modify the duty-cycle of the oscillating signal 50 derived from the MEMS or crystal oscillator 20. For this, the control unit 34 of the duty-cycle controller 30 is coupled or interconnected with a duty-cycle modifier 26 that is implemented in the MEMS or crystal oscillator 20 and receives a signal from the signal generator 24.

When receiving a respective duty-cycle modification signal from the control unit 34, the duty-cycle modifier 26 is operable to modify the duty-cycle of the oscillating signal 50. Modification of the duty-cycle may be conducted in discrete steps. For instance, the given or a default duty-cycle of the oscillating signal 50 may be increased by a discrete step. Then and in a next step the duty-cycle controller 30, in particular its measurement unit 32 is operable to monitor any changes in the amplitude or magnitude of the selected harmonic component 42 in the filtered intermediate signals 40.

If the magnitude or amplitude of the higher harmonic component 42 decreases, the duty-cycle will be further modified in the same direction until a minimum of the amplitude or magnitude of the harmonic component 42 has been reached. In case that the initial increase of the duty-cycle leads to an increase of the magnitude or amplitude of the higher harmonic component 42 in the filtered intermediate signals 40, the duty-cycle will be decreased in a proceeding step and eventually in consecutive steps until a minimum of the magnitude or amplitude of the higher harmonic component 42 of the filtered intermediate signals 40 has been reached.

In order to conduct a comparison between an actually measured and a previously present magnitude or amplitude of the higher harmonic component 42 of the filtered intermediate signals 40 the duty-cycle controller 30 comprises a memory 36. The memory 36 may be implemented in various different ways. It may comprise a shift register allowing to temporarily store the actual and eventually several previously measured amplitudes or magnitudes of selected higher harmonic components 42 of the filtered intermediate signals 40. The memory 36 therefore allows conducting a comparison between actually measured harmonic components 42 with previously stored harmonic components in order to decide whether the actual or previous duty-cycle modification led to a further suppression and reduction of the selected harmonic component 42 in the filtered intermediate signals 40.

In this way, the duty-cycle controller 30, the MEMS or crystal oscillator 20, the mixer 16 and the band-pass filter 18 form a regulation loop. Apart from that it is conceivable that other control schemes for suppressing higher harmonic components 42 of the filtered intermediate signals 40 may be implemented. It is generally conceivable that the memory 36 comprises and provides a look-up table by way of which predefined duty-cycles may be selected in response to an actual and quantitative measurement of the magnitude or of other characteristics of the higher harmonic component 42 of the filtered intermediate signals 40.

Figure 3:
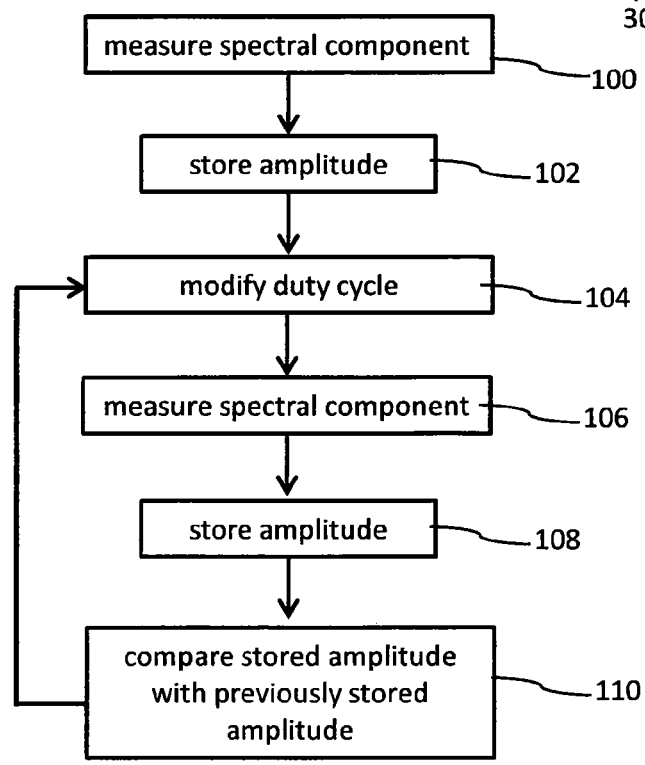
FIG. 3 shows a flowchart of the method executable by the signal receiver according to FIG. 2 in order to suppress at least one higher harmonic component of the signal receiver's MEMS or crystal oscillator.

In the flowchart of FIG. 3 the method of suppressing higher harmonic components 42 in the filtered intermediate signals 40 is exemplary illustrated. In a first step 100 at least one selected spectral component, hence a single or several higher harmonic components 42 coinciding with the band of interest 41 of the filtered intermediate signals 40 are actually measured and analyzed, typically by means of the measurement unit 32 of the duty-cycle controller 30. The magnitudes, hence the amplitudes of the actually measured and analyzed spectral components 42 are then stored in the memory 36 in a consecutive step 102. Thereafter, in step 104 the duty-cycle of the oscillating signal 50 generated by the crystal oscillator 20 is modified, typically in a predefined way and/or in a discrete step.

Thereafter in step 106 the spectral components, hence the magnitude or amplitude of selected higher harmonic components 42 of the filtered intermediate signals 40 are measured again. The measured amplitude or magnitude is then repeatedly stored in a subsequent step 108 in the memory 36. Thereafter, the actually stored amplitude or magnitude is compared with a or with several previously stored amplitudes or magnitudes of respective spectral components, hence with previously measured higher harmonic components 42 of the filtered intermediate signals 40.

After this comparison executed in step 110 the method jumps back to step 104 and modifies the duty-cycle of the oscillating signal 50 again. The modification depends on the output of the comparison. In the event that the comparison reveals that suppression of a selected higher harmonic component 42 has improved, the duty-cycle will be changed in the same way as before. In the event that the suppression of a selected higher harmonic component 42 became worse the duty-cycle will be changed and modified in the opposite sense.

Even though not particularly illustrated the method is particularly operable to deactivate the duty-cycle modification, in particular at those times in which the antenna 12 actually receives electromagnetic signals to be further processed by the signal receiver 10. It is therefore intended to execute a duty-cycle modification procedure as described above only and exclusively at those times where the signal receiver is in standby mode or where the signal receiver is substantially idle.

Furthermore it is to be mentioned, that the illustration of various components of the duty-cycle controller 30 and of various components of the MEMS or crystal oscillator 20 only reflects the operability and functionality of the duty-cycle controller and the MEMS or crystal oscillator. For instance, measurement unit 32, control unit 34 and memory 36 of the duty-cycle controller may be implemented in a single and common integrated circuit. The same may be also valid for the internal structure of the MEMS or crystal oscillator 20.

What is claimed is:

1. A signal receiver, comprising:
an antenna for receiving electromagnetic signals;
at least one low noise amplifier for amplifying signals received by the antenna;
at least one MEMS or crystal oscillator comprising a reference resonator to generate an oscillating signal with a predefined duty-cycle;
a mixer for mixing the amplified and received signals with the oscillating signal to generate intermediate signals;
a band-pass filter to filter the intermediate signals; and
a duty-cycle controller coupled to the at least one MEMS or crystal oscillator and coupled to the output of the band-pass filter to analyze a spectrum of the filtered intermediate signals and to modify the duty-cycle of the oscillating signal in response to the spectrum analysis of the filtered intermediate signals, said duty-cycle being defined by a ratio of ON times and OFF times of the oscillating signal, in order to minimize an amplitude of at least one higher harmonic component from the at least one MEMS or crystal oscillator having the reference resonator in the filtered intermediate signals,
wherein the duty-cycle controller comprises a measurement unit to measure the magnitude of a selected harmonic component of the filtered intermediate signals, and a control unit coupled to the measurement unit and being operable to generate a duty-cycle modification signal in response to the measured magnitude of the selected harmonic component, and
wherein the signal receiver includes a duty-cycle modifier coupled to or integrated into the duty-cycle controller, wherein the duty-cycle modifier is operable to increase or to decrease the duty-cycle of the oscillating signal in response to the duty-cycle modification signal obtained from the control unit.

2. The signal receiver according to claim 1, wherein the duty-cycle controller comprises a memory to at least temporarily store a measured magnitude of the harmonic component.

3. The signal receiver according to claim 2, wherein the control unit is operable to compare the magnitude of an actually measured harmonic component with the magnitude of a previously stored harmonic component to generate the duty-cycle modification signal.

4. The signal receiver according to claim 1, wherein the duty-cycle controller is at least temporarily deactivatable when the antenna receives electromagnetic signals.

5. A method of suppressing at least one higher harmonic component from the MEMS or crystal oscillator having the reference resonator in filtered intermediate signals of a signal receiver according to claim 1, the method comprising the steps of:
receiving electromagnetic signals by means of an antenna;
amplifying the received signals by means of at least one low noise amplifier;
generating an oscillating signal by means of at least one MEMS or crystal oscillator comprising a reference resonator;
mixing the amplified and received signals with the oscillating signal to generate intermediate signals;
filtering the intermediate signals by means of a band-pass filter;
analyzing the spectrum of the filtered intermediate signals; and
modifying the duty-cycle of the oscillating signal in response to a spectrum analysis of the filtered intermediate signals by means of a duty-cycle controller coupled to the at least one MEMS or crystal oscillator and coupled to the output of the band-pass filter, said duty-cycle being defined by a ratio of ON times and OFF times of the oscillating signal, in order to minimize an amplitude of at least one higher harmonic component from the at least one MEMS or crystal oscillator having the reference resonator in the filtered intermediate signals,
wherein the duty-cycle of the oscillating signal is decreased or increased in predefined discrete steps until the amplitude of a selected higher harmonic component from the at least one MEMS or crystal oscillator having the reference resonator reaches a minimum in the filtered intermediate signals.

6. The method according to claim 5, wherein the amplitude of the higher harmonic component in the filtered intermediate signal is measured and at least temporarily stored in a memory.

7. The method according to claim 6, wherein the duty-cycle of the oscillating signal is decreased or increased depending on a comparison between an actually measured amplitude and a previously stored amplitude of the higher harmonic component in the filtered intermediate signals.

8. The method according to claim 5, wherein the duty-cycle of the oscillating signal is kept constant at times where the antenna receives electromagnetic signals.

* * * * *